(12) United States Patent
Böhning et al.

(10) Patent No.: US 11,174,989 B2
(45) Date of Patent: Nov. 16, 2021

(54) SENSOR ARRANGEMENT AND METHOD OF SECURING A MONITORED ZONE

(71) Applicant: SICK AG, Waldkirch (DE)

(72) Inventors: Markus Böhning, Waldkirch (DE); Ulrich Druzella, Waldkirch (DE); Lars Schubert, Waldkirch (DE); Heiko Steinkemper, Waldkirch (DE)

(73) Assignee: SICK AG, Waldkirch (DE)

( * ) Notice: Subject to any disclaimer, the term of this patent is extended or adjusted under 35 U.S.C. 154(b) by 271 days.

(21) Appl. No.: 16/535,452

(22) Filed: Aug. 8, 2019

(65) Prior Publication Data

US 2020/0056742 A1 Feb. 20, 2020

(30) Foreign Application Priority Data

Aug. 15, 2018 (EP) ..................................... 18189151

(51) Int. Cl.
*F16P 3/14* (2006.01)
*G01V 8/20* (2006.01)

(52) U.S. Cl.
CPC ............... *F16P 3/142* (2013.01); *F16P 3/144* (2013.01); *G01V 8/20* (2013.01)

(58) Field of Classification Search
CPC .............. F16P 3/142; F16P 3/144; G01V 8/20
USPC ......................................................... 382/103
See application file for complete search history.

(56) References Cited

U.S. PATENT DOCUMENTS

| | | | | |
|---|---|---|---|---|
| 2011/0298579 A1* | 12/2011 | Hardegger | ............... | G01S 17/10 340/3.1 |
| 2012/0123563 A1* | 5/2012 | Drinkard | ................ | F16P 3/142 700/13 |
| 2012/0146789 A1* | 6/2012 | De Luca | .................. | H04N 3/38 340/540 |
| 2016/0104046 A1* | 4/2016 | Doettling | ............. | H04N 13/239 382/103 |
| 2017/0350557 A1* | 12/2017 | Hakins | ...................... | G01V 3/10 |
| 2018/0143345 A1* | 5/2018 | Jahn | ...................... | G01B 11/026 |

FOREIGN PATENT DOCUMENTS

| | | |
|---|---|---|
| DE | 29602098 U1 | 5/1996 |
| DE | 102004044973 A1 | 3/2006 |
| DE | 102004038906 B4 | 10/2007 |
| DE | 202018103012 U1 | 7/2018 |
| EP | 1164556 B1 | 12/2001 |
| EP | 1635107 B1 | 3/2006 |
| EP | 1752702 A1 | 2/2007 |

(Continued)

OTHER PUBLICATIONS

EP Search Report; dated Mar. 20, 2019; Corresponding EP Application No. 18189151.6.

*Primary Examiner* — Kerri L McNally
(74) *Attorney, Agent, or Firm* — Nath, Goldberg & Meyer; Jerald L. Meyer (57) ABSTRACT

A sensor arrangement for securing a monitored zone having at least one hazard zone with respect to a machine is provided, wherein the sensor arrangement has at least one optoelectronic monitoring sensor for detecting objects in the monitored zone and has a control and evaluation unit that is configured to compare the positions of detected objects with the hazard zone and to initiate a safety-relevant response of the machine in the case of a dangerous position. The control and evaluation unit is furthermore configured to generate and to monitor a further hazard zone with respect to a detected object.

20 Claims, 4 Drawing Sheets

(56) References Cited

FOREIGN PATENT DOCUMENTS

EP         1826589 B1    8/2007
EP         2282106 A1    2/2011

\* cited by examiner

SENSOR ARRANGEMENT AND METHOD OF SECURING A MONITORED ZONE

BACKGROUND

1. Field

The invention relates to a sensor arrangement for securing a monitored zone having at least one hazard zone with respect to a machine, wherein the sensor arrangement has at least one optoelectronic monitoring sensor for detecting objects in the monitored zone and has a control and evaluation unit that is configured to compare the positions of detected objects with the hazard zone and to initiate a safety-relevant response of the machine in the case of a dangerous position. The invention further relates to a method of securing a monitored zone having at least one hazard zone with respect to a machine, wherein objects are detected in the monitored zone and the positions of detected objects are compared with the hazard zone to initiate a safety-relevant response of the machine in the case of a dangerous position.

2. Description of the Related Art

The primary goal of safety engineering is to protect persons from hazard sources such as, for example, machines in an industrial environment represent. The machine is monitored with the aid of sensors and accordingly, if a situation is present in which a person threatens to come dangerously close to the machine, a suitable securing measure is taken.

3D sensors are inter alia used for the monitoring. They initially include 3D cameras in different technologies, for example stereoscopy, triangulation, time of flight, or evaluation of the interference of passive two-dimensional patterns or of projected illumination patterns. Such 3D sensors, in contrast to a conventional two-dimensional camera, record images that include a distance value in their pixels. These depth-resolved or three-dimensional image data are also called a depth map. Laser scanners are furthermore known that scan in two directions or in all three directions and that likewise detect three-dimensional image data over the respective scanning angles and the measured distance. The higher instrument and evaluation effort for generating three-dimensional image data in comparison with a two-dimensional image detection is justified by the additional information in a number of applications.

Sensors used in safety technology or for the protection of persons have to work particularly reliably and must therefore satisfy high safety demands, for example the standard EN 13849 for safety of machinery and the machinery standard IEC 61496 or EN 61496 for electrosensitive protective equipment (ESPE). To satisfy these safety standards, a series of measures have to be taken such as a safe electronic evaluation by redundant, diverse electronics, functional monitoring or special monitoring of the contamination of optical components.

The common securing concept provides that protected fields are configured that may not be entered by operators during the operation of the machine. If the sensor recognizes an unauthorized intrusion into the protected field, for instance a leg of a worker, it triggers a safety-relevant stop of the machine. In some cases, additional warning fields are positioned in front of the protected fields to prevent a person from a protected field infringement in good time or to reduce the working speed of the machine as a precaution. Protected fields have to be configured as relatively large to satisfy all conceivable cases so that a system reaction that reduces productivity occurs at a comparatively early time.

Protected fields in addition do not permit any close cooperation with machines, in particular with robots (HRC, human robot collaboration). Relevant standards in this connection are, for example, ISO 10218 for industrial robots or ISO 15066 for collaborative robots. Safety distances should be configured as small as possible in HRC and possibly even in a situation-adapted manner, naturally with the proviso that safety is maintained. Standards ISO 13854, ISO 13855, and ISO 13857 deal with the establishment of safety distances.

An evaluation of objects and machines with respect to speed and to mutual distance is called "speed and separation monitoring" in said robot standards. It is expediently not the distance from the machine itself that is measured here. This would be too complex and too dynamic and a sufficient safety distance from future machine positions should also be observed. It is therefore sensible to predefine a hazard zone, that is a spatial region or a volume within which the machine carries out work movements.

Such approaches have, however, not yet been satisfactorily implemented in known securing concepts. Work is still all too frequently carried out under "worst case" assumptions without situatively responding to the actual instantaneous risk. This relates to safety distances and to buffers, but also to the detected objects that are treated the same and are not differentiated by humans and other mobile or static objects. The accessibility of the plant and the cooperation between the worker and the machine remain substantially restricted. A large production area is therefore still required and the increase in flexibility sought is not achieved.

DE 10 2004 038 906 B4 discloses electrosensitive protective equipment in which a contactless recognition device reads a mark applied to the object before an entry of an object into the monitored zone and configures the protective equipment accordingly. Objects can in this manner activate a bridging of the protective equipment in this manner and can pass without triggering the protective function.

However, DE 10 2004 038 906 B4 relates to a light grid that is already not suitable for a flexible monitoring using human robot collaboration. The light grid already has the protected field idea in the sensor principle.

A light grid acting as electrosensitive protective equipment is combined with a camera that detects and classifies objects at either side of the light grid in EP 1 164 556 B1. The light grid is temporarily deactivated for objects recognized as permitted. This is an alternative to a mark as in DE 10 2004 038 906 B4 to recognize permitted objects and to allow them to pass. However, the described disadvantages of a light grid remain.

EP 1 826 589 B1 monitors a protected zone by a camera. It is able to distinguish safety-critical and non-safety critical objects on the basis of a detected marking on the object and to bridge a region of the protected zone for a non-safety critical object, with the region being predefined by information encoded in the marking. Although a camera is used instead of a light grid, the safety concept is still based thereon and at least still utilizes a protected field that is even statically defined and that is only temporarily partly deactivated.

A laser scanner or a camera system is known from DE 10 2004 044 973 A1 that recognizes a contour of a permitted object in the monitored zone. A safety signal is output with objects whose contours cannot be identified as permitted. A person would, however, actually not be permitted to approach as desired so that this concept cannot be transferred to a close human robot collaboration. Apart from this, it would also be exceptionally difficult to identify a person on the basis of a contour with a reliability that satisfies the demands of a safety engineering application.

EP 1 635 107 B1 uses protected fields that are dynamically varied in dependence on parameters of a machine control of the monitored machine. The respective calculation of the protected fields is complex, particularly when the protected fields are to be configured concisely to actually improve the flexibility. EP 1 635 107 B1 can in principle not escape from the protected field idea.

SUMMARY

It is therefore the object of the invention to improve the monitoring of a machine.

This object is satisfied by a sensor arrangement and by a method of securing a monitored zone having at least one hazard zone with respect to a machine in accordance with the respective independent claim. A hazard zone is a spatial zone that secures a machine so that no-one is injured by the machine. Persons may accordingly not be present there because otherwise an accident occurs. The machine is preferably at least partly in the hazard zone for this purpose. It is conceivable to secure a plurality of different regions of a machine or of a plurality of machines having a plurality of hazard zones. A hazard zone may not be confused with a protected field that is namely situated in front of the hazard zone to prevent an approach of persons to the hazard zone. Unlike the hazard zone, a protected field is typically free of all kinds of moving machine parts.

At least one optoelectronic monitoring sensor detects objects in the monitored zone. The monitoring sensor is preferably safe, that is, it is designed for a safety engineering application and satisfies the standards named in the introduction or corresponding standards to secure a hazardous machine. An optoelectronic monitoring sensor typically comprises at least one light receiver by which a received signal is acquired from received light from the monitored zone. The configuration of the light receiver and thus the kind of received signal depend on the kind of monitoring sensor. An example for the light receiver is an image sensor in which the pieces information read from the pixels are called the received signal in sum.

A control and evaluation unit determines the positions of the detected objects, in particular from the received signal of a light receiver, and compares these positions with the hazard zone. If the instantaneous position is accordingly evaluated as dangerous, for instance because an object comes too close to a hazard zone, a safety-related response of the machine is initiated. The control and evaluation unit here designates analog circuits or digital evaluation modules of the monitoring sensor itself or of other apparatus of the sensor arrangement. A minimal configuration of the sensor arrangement is accordingly a single monitoring sensor having an internal control and evaluation unit.

The invention starts from the basic idea of not being exclusively directed to persons as detected objects that are protected from the machine. The possibility should rather also be present of treating a detected object as a separate starting point of a hazard. This preferably only relates to specific detected objects that actually require securing and that are identified as a starting point of a separate hazard, for example mobile machines. To secure them, a further hazard zone is generated and monitored with respect to a detected object. The other detected objects are still treated as unknown objects and thus as potential persons that may not be in a dangerous position with respect to a hazard zone or, optionally, as still known permitted objects that are ignored. The further hazard zone is preferably mobile; it is produced on a penetration of the detected object into the monitored zone and follows its further movement. If the object leaves the monitored zone, the further hazard zone can no longer be monitored and can therefore be dissolved.

The invention has the advantage that a more productive human machine collaboration becomes possible by a differentiated treatment of expected objects and the worker to be protected. The safety of the worker has the highest priority in an unchanged manner here. A situation-adapted detection and evaluation of the risk with a dynamic adaptation of static and mobile hazard zones permits a closer collaboration in which required safety distances are directed to the actual risk and not to general scenarios. The worker can also be reacted to at an early time and by measures such as a replannng of worksteps and paths as well as reduced speeds of work and movement to avoid an emergency stop as a rule and to enable an automatic restart.

The comparison of the position of detected objects with a hazard zone preferably comprises the determination of a shortest distance of an object from the hazard zone. The distance of the object from the hazard zone is thus a criterion of whether a position is dangerous or is even the most important or only criterion in a preferred embodiment. In other words, the danger is evaluated with reference to the minimal safety distance still observed. The shortest distance does not have to remain the only criterion. A preferred additional criterion is the movement vector of an object, that is its speed and its direction of movement. An object can here mean both an unknown detected object of which it is assumed for safety reasons that it is a person and a mobile machine or the like so that the movement vector of the hazard zone is then looked at. A further criterion can be deduced from the movement history in that a future change of the movement vector is anticipated from it.

The sensor arrangement is preferably able to monitor a plurality of hazard zones. There can be a different reasons for this. On the one hand, in a preferred basic configuration, a stationary machine should be monitored as the hazard zone and if then a detected object is identified as an additional starting point of a danger, in particular as a mobile machine, the further hazard zone is added to secure the new danger. The case is furthermore conceivable that a plurality of detected objects are secured by a further hazard zone. Other examples are a plurality of stationary machines as early as in the basic configuration or a single machine having a plurality of dangerous part zones for which a plurality of smaller hazard zones are monitored instead of a single, unnecessarily large bounding box. On a monitoring of a plurality of hazard zones, the shortest distance over all hazard zones and objects, or alternatively a shortest distance from the respective object for every hazard zone, is determined.

The control and evaluation unit is preferably configured to ignore objects within hazard zones. The hazard zone itself is therefore considered free of objects to be detected or rather as blocked by the machine. There would actually absolutely be space for such objects depending on the bounding box that models the machine as the hazard zone. The machine naturally also itself forms an object that is first detected by the monitoring sensor. All that is, however, preferably intentionally ignored and the hazard zone is modeled as an empty block free of objects. This simplifies the monitoring and the determination of shortest distances since the dynamics of the machine within the hazard zone thus do not play any role. This is also unproblematic from a safety engineering aspect since each object is recognized in good time when it approaches the hazard zone.

The control and evaluation unit is preferably configured to move the further hazard zone as a dynamic hazard zone together with the detected object. The further hazard zone is preferably generated as soon as the associated detected object first enters into the monitored zone; alternatively only when it arrives in a specific part region. In both cases, not only the first position should be secured, but also the further movement of the detected object and the dynamic hazard zone moved along serves this purpose. The co-movement can in particular be achieved by a switchover of hazard zones, with one respective hazard zone being responsible for the current position and at least one other hazard zone being responsible for the new position. In contrast, static hazard zones are sufficient in principle in the securing of a stationary machine. A switchover of hazard zones can also be useful here for different worksteps or machine states within a process routine.

The monitoring sensor is preferably a camera, in particular a 3D camera. Different technologies are known for the distance measurement of a 3D camera such as a time of flight principle using a direct time of flight measurement of light signals or a phase measurement or a distance estimate from brightness values or focal positions (DFF, depth from focus, DFD, depth from defocus) The 3D camera particularly preferably uses a triangulation principle, however, in which two camera images of a moving camera or of a stereo camera are correlated with one another or alternatively an illumination pattern is correlated with a camera image to thus estimate disparities and to determine distances therefrom. In another preferred embodiment, the monitoring sensor is a laser scanner that measures distances using a time of flight process and associates them with the respective scanning angle in the course of a scan movement. This scan plane can be expanded by an additional scan movement in elevation or by a plurality of scanning beams offset in elevation to form a three-dimensional spatial zone so that the laser scanner generates a 3D point cloud like a 3D camera.

The sensor arrangement preferably has a plurality of monitoring sensors whose monitored zones and/or perspectives complement one another. They can be a plurality of similar monitoring sensors such as a plurality of stereo cameras, but also hybrid arrangements, for instance with laser scanners and cameras. A possible advantage of a plurality of monitoring sensors is to detect a larger monitored zone overall by mutual complementing and different perspectives are helpful to minimize shadows. It is also conceivable by redundant monitoring to configure the individual monitoring sensors as unsafe in the sense of the standards named in the introduction and to achieve the safety by redundancy. To in particular calculate shortest distances simply, every monitoring sensor can per se determine the shortest distance from a hazard zone and the globally shortest distances are then subsequently found on this basis. The evaluation remains decoupled, parallelizable, and easy to handle in this manner. A combination is, however, also conceivable at an early point in time, for instance by a merger of 3D point clouds.

The monitoring sensor is preferably configured for a detection capacity in which objects from a minimum size onward are safely detected, with only objects of the minimum size being considered for the determination of the shortest distance. The detection capacity is a specified suitability of a sensor that is safe in the sense of the introductory standards or of comparable standards to safely detect objects of a minimum size in the total monitored zone. The corresponding configuration of the sensor relates to its design, that is its optics, its light receiver, and further possible components, not yet named, such as lighting, and the safe evaluation. The detection capacity in the first instance does not preclude smaller objects from also being detected. However, protection is not guaranteed for objects that are smaller than the minimum size; for example, a finger is not reliably detected with a sensor designed for arm protection. Objects smaller than the minimum size are therefore possibly excluded in the evaluation by means of filtering. It is also possible to select a minimum size above the detection capability, that is not to utilize a resolution provided per se. Numerical examples can be given as 10 mm for finger protection or in the range from 30-80 mm for the protection of extremities, in particular 55 mm for upper arm protection. Objects that are smaller than the minimum size can be considered in this preferred embodiment neither as a person nor as a mobile machine or the like for which a further hazard zone would have to be generated.

The sensor arrangement preferably has a safety control in which at least part of the control and evaluation unit is implemented. The control and evaluation functionality is thus divided into an internal portion within the monitoring sensor and an external portion in the safety control. Both extremes with a fully autonomous monitoring sensor that has this functionality itself and only outputs the safety-relevant signal or with a monitoring sensor only delivering raw measured signals are conceivable. A particularly advantageous distribution of work provides that the monitoring sensor provides safe values for the shortest distances between detected objects and hazard zones and that the safety control thus carries out the safety related evaluation and decides whether a safety-relevant response is required. Examples for a securing are an emergency stop, a braking, an evading, or a putting into a safe position. The actual securing preferably takes place by the machine control that can in another respect likewise take over the functionality of the safety control in a further embodiment.

The control and evaluation unit is preferably configured to recognize with the aid of the detection by the monitoring sensor whether a further hazard zone is generated with respect to a detected object. The recognition of objects to be secured, in particular of mobile objects, thus takes place on the basis of the observation of measured data of the monitoring sensor. No further apparatus are thereby required in the sensor arrangement to identify objects for which a further hazard zone is to be generated.

The control and evaluation unit preferably identifies a contour or another optically detectable structure of the detected object. In an embodiment, specific contours of mobile machines such as robots or automated guided vehicles (AGVs) are taught or invoked from a database for this purpose and are compared with the detected contours for identification. In another embodiment, typical contours are described and thus recognized again by general properties or functional routines. The identification is preferably supported by a specific optical detectable structure at the object to be detected. It can be an optical code in a further sense, a color marking, or a specific 3D structure that is applied to the object. In a narrower sense, it is a 2D code or a barcode that is read.

The sensor arrangement preferably comprises an additional sensor, in particular an optical code reader or an RFID reader, wherein the control and evaluation unit is configured to recognize on the basis of data of the additional sensor whether a further hazard zone is generated with respect to a detected object. The additional sensors admittedly increases the complexity of the sensor arrangement, but the additional sensor is in turn specialized on the identification and can, for example, read an optical code as a barcode scanner or as a camera-based code reader even if the resolution of the monitoring sensor is not sufficient for this purpose. In the case of an RFID reader that should also include similar transmission processes such as NFC (near field communication), the specific identification is decoupled from the monitoring by utilizing a completely different physical principle. A further alternative is an active communication of the mobile machine with the sensor arrangement via a wireless protocol or via a higher ranking control that is connected both to the mobile machine and to the sensor arrangement. It is then, however, not sufficient that the mobile machine registers itself at the sensor arrangement via the control, but the sensor arrangement rather checks, with the aid of its monitoring sensor, whether the mobile machine actually enters into the monitored zone at the indicated position so that the further hazard zone actually ensures the safety for persons in the monitored zone.

The control and evaluation unit is preferably configured to recognize a detected object as a permitted object with the help of the detection by the monitoring sensor or using data of an additional sensor, with a permitted object not triggering any safety-relevant response independently of its position with respect to the hazard zone. The detected objects are further differentiated in this embodiment. The basic assumption is that a detected object is a person. Some objects are identified as a hazard and a further hazard zone is generated for them. Conversely, there are also objects that do not represent any danger either because a collision would not endanger a person or because they provide their own securing themselves. Such objects are permitted in the monitored zone and may move there and may also approach a monitored stationary machine. Even if a collision of the object permitted per se with the machine occurs due to an incorrect control, this does not relate to personal protection and thus does not come under the responsibility of the sensor arrangement. The permissibility can be restricted to part zones of the monitored zone.

The control and evaluation unit is preferably configured to output feedback to the detected object on the generation of a hazard zone. This feedback can be a light signal or a radio signal or can be transmitted by means of a higher ranking control. If the detected object is a mobile machine, a mobile robot, or an AGV, the machine control in this manner receives reconfirmation that a further hazard zone has been generated and the securing has now been taken over by the sensor arrangement. This can be a requirement for the machine control continuing to move the mobile machine or it now changes its own securing, in particular by deactivation, for the duration of the presence in the monitored zone.

The control and evaluation unit is preferably configured to generate a hazard zone with respect to a detected object only at at least one specific position in the monitored zone. The specific position thus represents a kind of access lock. The identification only at specific positions can be associated with mobile machines that penetrate into the monitored zone at other points resulting in a safety-relevant response. Alternatively, the mobile machine that does not use the access lock remains fully responsible for its own securing. The specific position is a particularly suitable location to mount an additional sensor for the identification. The traveling to a specific position or in more general terms the penetration into the monitored zone with a specific movement pattern can facilitate the identification of which detected objects a further hazard zone should be generated for.

The control and evaluation unit is preferably configured to obtain hazard zone information on the hazard zone to be generated from the detected object and/or to determine it with the aid of the monitoring sensor. The hazard zone information provides support in the geometric design of the further hazard zone and in the safety evaluation of the position of further detected objects with respect to the further hazard zone.

The hazard zone information preferably includes at least one of the following pieces of information: a binary piece of information that a hazard zone should be generated; a position; a speed; a previous or probable movement path; or a geometry of the object. The binary piece of information is a characteristic for detected objects, i.e. in particular for mobile machines that require their own securing by means of further hazard zones. Said parameters can be abstractly read as information from an optical code, for example, and can also be determined themselves with the aid of measurement data of the monitoring sensor. Preferably, both take place and a comparison takes place as to whether the transmitted hazard zone information and the hazard zone information that is itself detected match one another, whereupon a safety-relevant response can then optionally take place. The probable movement path is extrapolated from the previous history here.

The hazard zone information preferably includes at least one of the following pieces of information: a planned movement path; a planned speed; a planned workstep; a volume adopted in the future; or a hazard zone configuration. They are pieces of information that the monitoring sensor cannot detect itself and that typically originate from a specification of the mobile machine or from its machine control. A planned movement path can unexpectedly differ from the extrapolation of a previous movement path just as a sudden acceleration or deceleration and a new workstep cannot always be recognized in advance. The sensor arrangement can also already have the matching hazard zone configuration as such communicated to it, with parameters also being sufficient for this purpose that fix or facilitate a hazard zone configuration. There are mobile machines that work in a safety mode at a reduced speed or with a reduced work zone and it can then be sensible to communicate to the sensor arrangement that the mobile machine is in this safety mode or which specific limitations it is therefore subject to.

The method in accordance with the invention can be further developed in a similar manner and shows similar advantages in so doing. Such advantageous features are described in an exemplary, but not exclusive manner in the subordinate claims dependent on the independent claims.

BRIEF DESCRIPTION OF THE DRAWINGS

The invention will be explained in more detail in the following also with respect to further features and advantages by way of example with reference to embodiments and to the enclosed drawing. The Figures of the drawing show in.

DETAILED DESCRIPTION OF THE PREFERRED EMBODIMENTS

Figure 1:
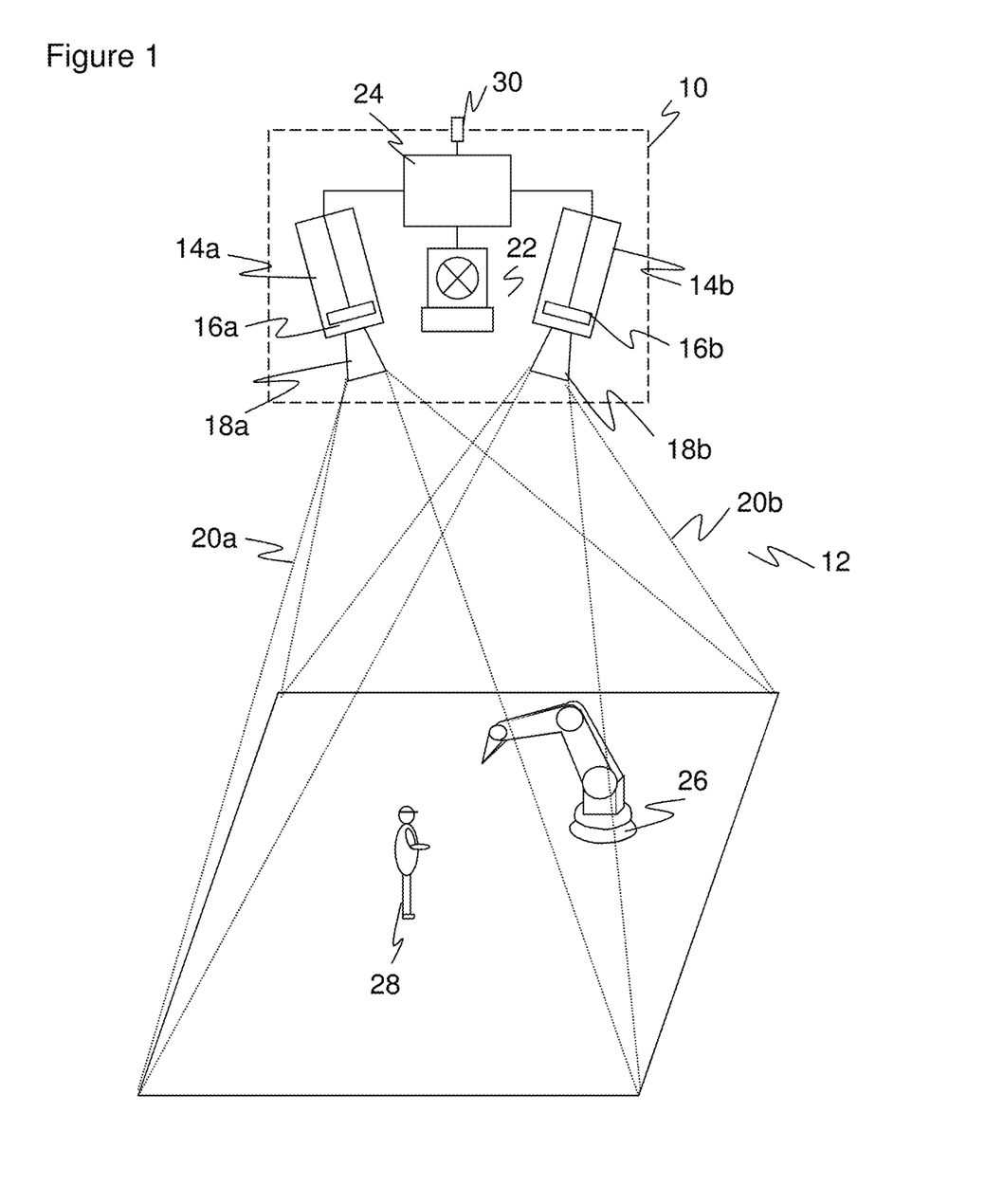
FIG. 1 a schematic three-dimensional representation of a 3D camera and its monitored zone.

FIG. 1 shows the general design of a stereo camera for recording a depth map in a schematic three-dimensional representation. The stereo camera is only one example for a monitoring sensor 10 with respect to which the object detection will be explained in the particularly advantageous case of a three-dimensional spatial monitoring. The other 3D cameras mentioned in the introduction would equally be conceivable and, as a further alternative, other optoelectronic sensors such as 2D cameras or laser scanners.

Two camera modules 14a, 14b are mounted at a known fixed distance from one another for the detection of a monitored zone or spatial zone 12 and each take images of the spatial zone 12. An image sensor 16a, 16b, usually a matrix-type reading chip, is provided in each camera module 14a, 14b and records a rectangular pixel image, for example a CCD or a CMOS sensor. The two image sensors 16a, 16b together form a 3D image sensor or light receiver for detecting a depth map. One objective 18a, 18b having an imaging optics is associated with each of the image sensors 16a, 16b respectively which in practice can be realized as any known imaging objective. The maximum angle of view of these optics is shown in FIG. 1 by dashed lines which each form a pyramid of view 20a, 20b.

An illumination unit 22 is provided between the two image sensors 16a, 16b to illuminate the spatial zone 12 with a structured pattern. The stereo camera shown is accordingly configured for active stereoscopy in which the pattern also imparts evaluable contrasts everywhere to scenery that is structure-less per se. Alternatively, no illumination or a homogeneous illumination is provided to evaluate the natural object structures in the spatial zone 12, which as a rule, however, results in additional aberrations.

An evaluation and control unit 24 is associated with the two image sensors 16a, 16b and with the lighting unit 22. The control and evaluation unit 24 can be implemented in the most varied hardware, for example digital modules such as microprocessors, ASICS (application specific integrated circuits), FPGAs (field programmable gate arrays), GPUs (graphics processing units) or mixed forms thereof that can preferably be located in the monitoring sensor 10, but that can also be distributed over any desired internal and external components, with external components also being able to be integrated via a network or cloud provided that latencies can be managed or tolerated. Since the generation of the depth map and its evaluation is very processor intensive, an at least partly parallel architecture is preferably formed.

The control and evaluation unit 24 generates the structured illumination pattern with the aid of the illumination unit 22 and receives image data of the image sensors 16a, 16b. It calculates the 3D image data or the depth map of the spatial zone 12 from these image data with the aid of a stereoscopic disparity estimate. The total detectable spatial zone 12 can be restricted via a configuration, for example to mask interfering or unnecessary regions.

An important safety engineering application of the monitoring sensor 10 is the monitoring of a machine 26 that is symbolized by a robot in FIG. 1. The monitoring sensor 10 is preferably failsafe in the sense of safety standards such as those named in the introduction. The machine 26 can also be substantially more complex than shown, can consist of a number of parts, or can actually be an arrangement of a plurality of machines, for instance of a plurality of robots or robot arms. It is monitored whether objects 28, shown as a person, are at risk from the machine 26 and whether a corresponding safety-relevant response has to take place, for example whether the machine 26 stops, decelerates, or evades. For this purpose, the monitoring sensor 10 has a safe interface 30 via which corresponding responses are triggered or monitoring parameters required for a safety evaluation are output, either directly to the machine 26 or to an intermediate station such as a safe control.

Figure 2:
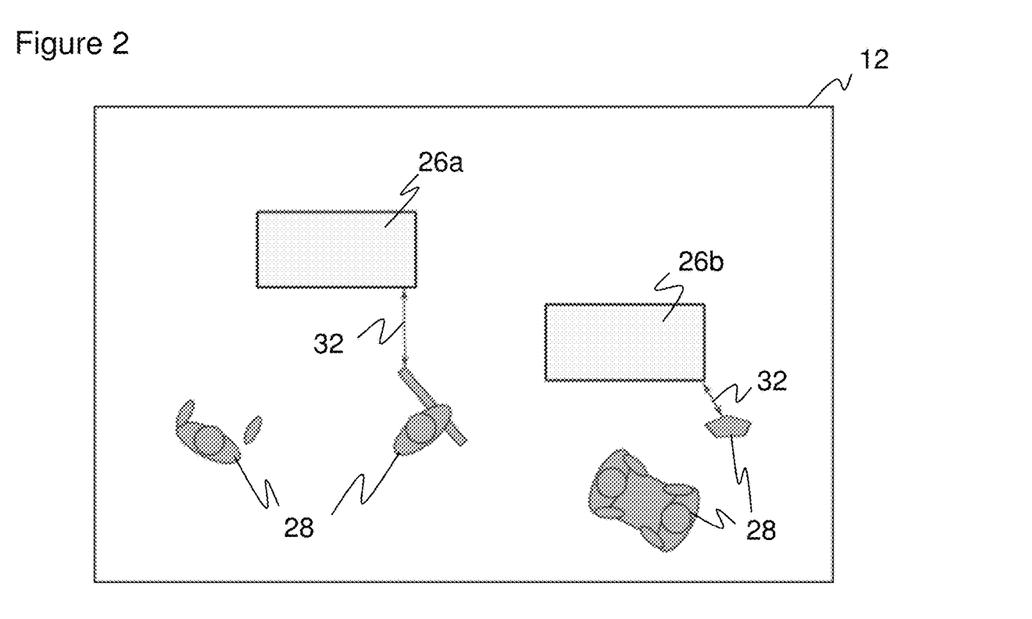
FIG. 2 an exemplary monitoring situation with a plurality of hazard zones and objects.

FIG. 2 shows an exemplary monitoring situation in the spatial zone 12. A particularly advantageous safety evaluation on the basis of a distance monitoring will be explained using this monitoring situation. In the example of FIG. 2, a plurality of hazard zones 26a, 26b and objects 28 are located in the spatial zone 12. A hazard zone 26a, 26b is a preferred model of the hazardous machine 26 and describes the zone possibly hazardous for humans as a volume in space. A hazard zone 26a, 26b is, for example, the spatial zone in which the machine 26 executes work movements in a respective time period or, even more generally, a spatial zone that secures the machine 26, either because the machine 26 is at least partly surrounded by it or because the hazard zone 26a, 26b blocks access to the machine 26. The hazard zone 26a, 26b can surround the machine 26 with a little spacing to leave sufficient clearance for the work movements.

A plurality of hazard zones 26a, 26b can be active in parallel. They, for example, model a plurality of machines 26 and/or a plurality of moving part sections of a machine 26. Hazard zones 26a, 26b can be rigid and can comprise all conceivable work movements. Alternatively, respective hazard zones 26a-b are defined for part sections of the work movement that are utilized in a sequence corresponding to the process and that are smaller and are better adapted. Hazard zones 26a, 26b can be preconfigured by a fitter, optionally per process step, in a corresponding software tool, also semiautomatically or fully automatically by observing the work routines, or can be dynamically taken over by a control of the machine 26.

Objects 28 are typically shown as persons because it is a question of personal protection, but with the monitoring sensor preferably not distinguishing whether an object 28 is a person or at least only on the basis of simple criteria such as minimum heights. Simple or complex body models are also not precluded, on the other hand. The control and evaluation unit 24 detects the objects 28 with the aid of the depth map. A possible representation is a so-called detection depth map whose pixels include a distance value wherever a valid object 28 was recognized at the respective lateral position, and that otherwise remains blank. In this connection, valid means that the object 28 is also still considered relevant after filtering with a minimum size, a body model, a relationship with a coarsely detected object such as in EP 3 200 122 A1, or the like.

Two hazard zones 26a, 26b are to be monitored in the example of FIG. 2 and four objects 28 are currently recognized by the monitoring sensor 10 in its environment. Two of the objects 28 are individual persons, without the monitoring sensor 10 having to explicitly acquire this information; a further object 28 comprises two persons merged together, either because they are carrying a workpiece together and are so actually connected or because the segmentation was unable to separate the two persons. There is additionally another object 28 that cannot be identified in any more detail and could be an article or a false detection. If it is beneath the minimum size, it can be ignored; otherwise it must be interpreted as a person as a precaution. The non-connected arm of the person at the far left forms, in dependence on the evaluation, a separate further object or is associated with the person, in particular according to the teaching of EP 3 200 122 A1.

The control and evaluation unit 24 continuously calculates the shortest distance of the object 28 closest to a respective hazard zone 26*a*, 26*b*. All the object points have to be looked at for this purpose in principle. The depth map is preferably prefiltered and only still includes the detected objects, or a detection map briefly introduced above is used that only includes the distances of the relevant objects from the monitoring sensor 10.

Arrows 32 are drawn in FIG. 2 that represent the shortest distances with respect to the hazard zones 26*a*, 26*b* in the current situation. The shortest distance connects the closest point of a hazard zone 26*a*, 26*b* to the nearest point of the next object 28. It is assumed in this representation that the small object 28 at the bottom right in FIG. 2 exceeds the minimum size. It would otherwise be ignored and instead the distance from the two merged persons who form the second-closest object 28 would be output. It must be noted that the two-dimensional view of FIG. 2 simplifies the determination of the shortest distances. In actual fact, three-dimensional distances between three-dimensional hazard zones 26*a*, 26*b* and objects 28 are to be determined and in so doing their projective shadows are also to be take into account in which a further object 28 could remain hidden from the monitoring sensor 10.

The respective last determined shortest distance with respect to a hazard zone 26*a*, 26*b* of the object closest to this hazard zone 26*a*, 26*b* is provided cyclically or acyclically depending on the required and possible response time of the monitoring sensor 10 at the safe interface 30, and indeed is preferably distinguishable per hazard zone 26*a*, 26*b*. A control connected to the safe interface 30, either a higher ranking control or that of the machine 26, evaluates the shortest distance and replans, where required, the next workstep in dependence on the shortest distance. In the danger case, a safety-relevant response is initiated so that the required safety distance between human and machine is continuously ensured. Whether this is necessary can depend, in addition to on the shortest distance, on further conditions such as the speeds or the properties of the object 28 and the machine zone 26, and on the impending collision, for which purpose further parameters are output with the shortest distance depending on the embodiment.

Figure 3:
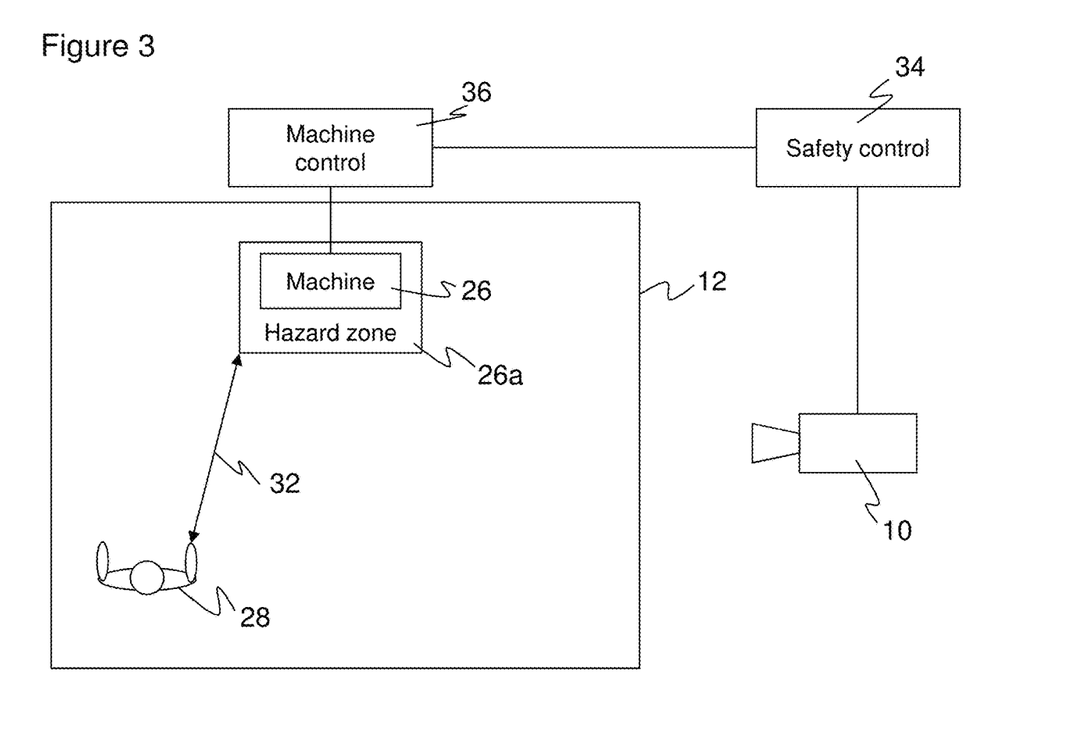
FIG. 3 a schematic representation of the monitoring of a static hazard zone.

FIG. 3 illustrates the monitoring of a hazard zone 26*a* with respect to a stationary machine 26. Within the spatial zone 12, the representation corresponds to FIG. 2 that is only shown simplified for reasons of clarity such that there is only one hazard zone 26*a* and only one object 28, namely a worker who has entered the spatial zone 12. The monitoring sensor 10 monitors the spatial zone 12, with alternatively an arrangement of a plurality of monitoring sensors 10 also being able to be provided to increase the monitorable spatial zone 12 and/or to minimize shadows, with at least one monitoring sensor 10 preferably adopting a perspective from above.

The monitoring sensor 10 preferably detects objects 28 in the spatial zone 12 in the manner described with respect to FIGS. 1 and 2 and calculates the shortest distance from the hazard zone 26*a* illustrated by the arrow 32. The shortest distances are output to a safety control 34 that is in turn connected to a machine control 36 of the machine 26. The shortest distances are evaluated in a safety-relevant manner in the safety control 34. Process data provided by the machine control can also enter into this evaluation. The safety control 34 can transmit information on the hazard zone 26*a* to the monitoring sensor 10. It is conceivable that this information originates at least in part from the machine control 36, with the machine 26 also being able to have its own sensors. The hazard zones 26*a* are preferably preconfigured in the monitoring sensor 10 and information transmitted at the time of flight relates, for example, only to a switchover of hazard zones 26*a* for a new workstep of the machine 26.

If the safety evaluation has the result that the object 28 adopts a dangerous position with respect to the hazard zone 26*a*, the safety control 34 generates a safe output signal for the machine control 36. Its safety-relevant response can reduce the risk in dependence on the situation by a reduced movement speed, by evasion, by replanning the following workstep, or by an emergency stop as the last resort.

The evaluation and control functionality can also be differently distributed over the monitoring sensor 10, safety control 34, and machine control 36, in particular in that the functionality of the safety control 34 is at least partially integrated in the monitoring sensor 10 or in the machine control 36, with the safety control 34 even being able to be fully dispensed with in the extreme cases of a complete takeover of its functionality. The safety control 34 can also be understood as part of a higher ranking control that is responsible for the total work zone, for instance a robot cell to which the monitored spatial zone 12 belongs.

Figure 4:
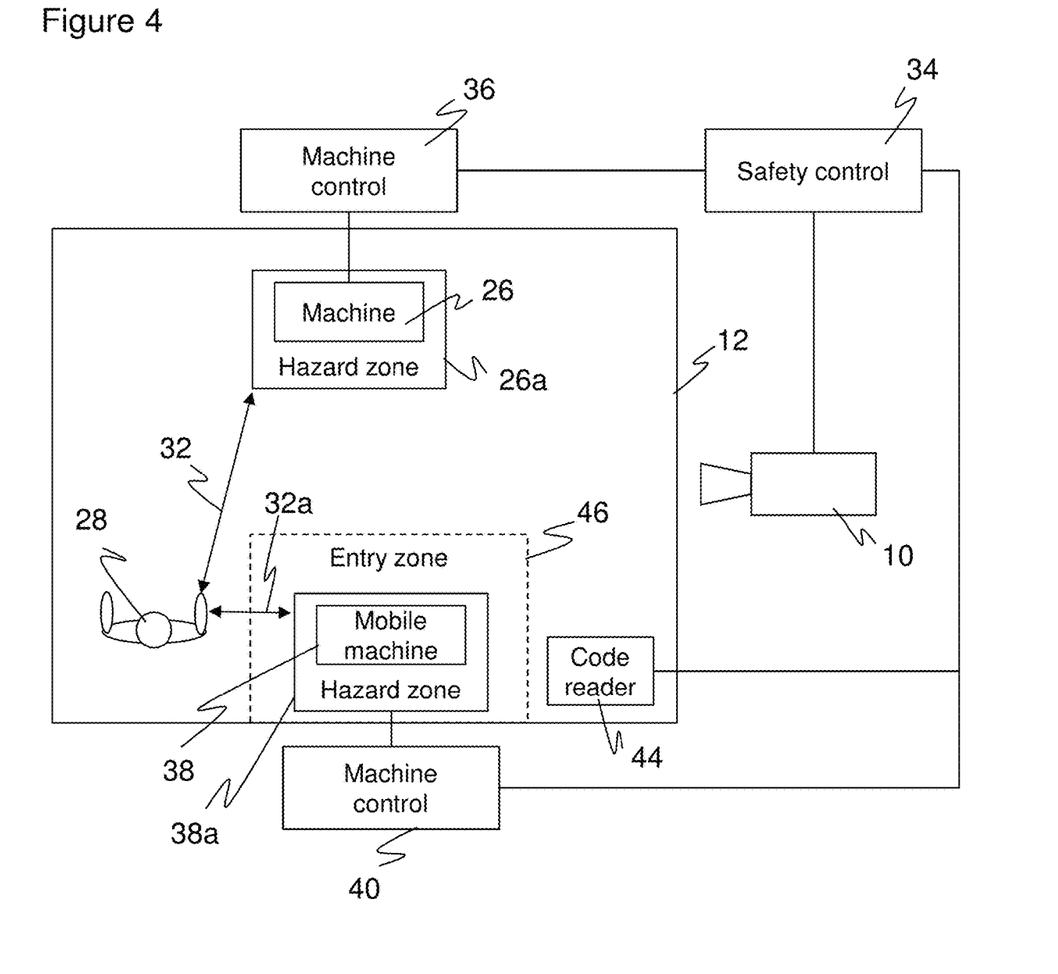
FIG. 4 a schematic representation of the monitoring of a mobile hazard zone that is generated for a machine moving into the monitored zone.

FIG. 4 shows a situation similar to FIG. 3, but with a particular object that has entered into the spatial zone, namely a mobile machine 38, additionally having been detected by the monitoring sensor 10. The mobile machine 38 represents a new object entering into the spatial zone 12 that itself represents a hazard from which persons must observe a safety distance. The mobile machine 38 has its own machine control 40 that is, for example, wirelessly connected to the safety control 34. In accordance with the invention, the mobile machine 38 is recognized and a further hazard zone 38*a* is generated for the mobile machine 38 to secure it during its movement through the spatial zone 12.

The further hazard zone 38*a* is equally monitored by the monitoring sensor 10 as the already explained hazard zone 26*a-b*. The difference is that the further hazard zone 38*a* is only dynamically generated or activated as soon as a mobile machine 38 that should be secured has been detected. Consequently, the shortest distance from the other detected objects 28 is also determined with respect to the further hazard zone 38*a*, as illustrated by an arrow 32*a*. If an object 28 is detected in a dangerous position with respect to the further hazard zone 38*a*, a safety-relevant response of the mobile machine 38 is initiated via the machine control 40.

Figure 5:
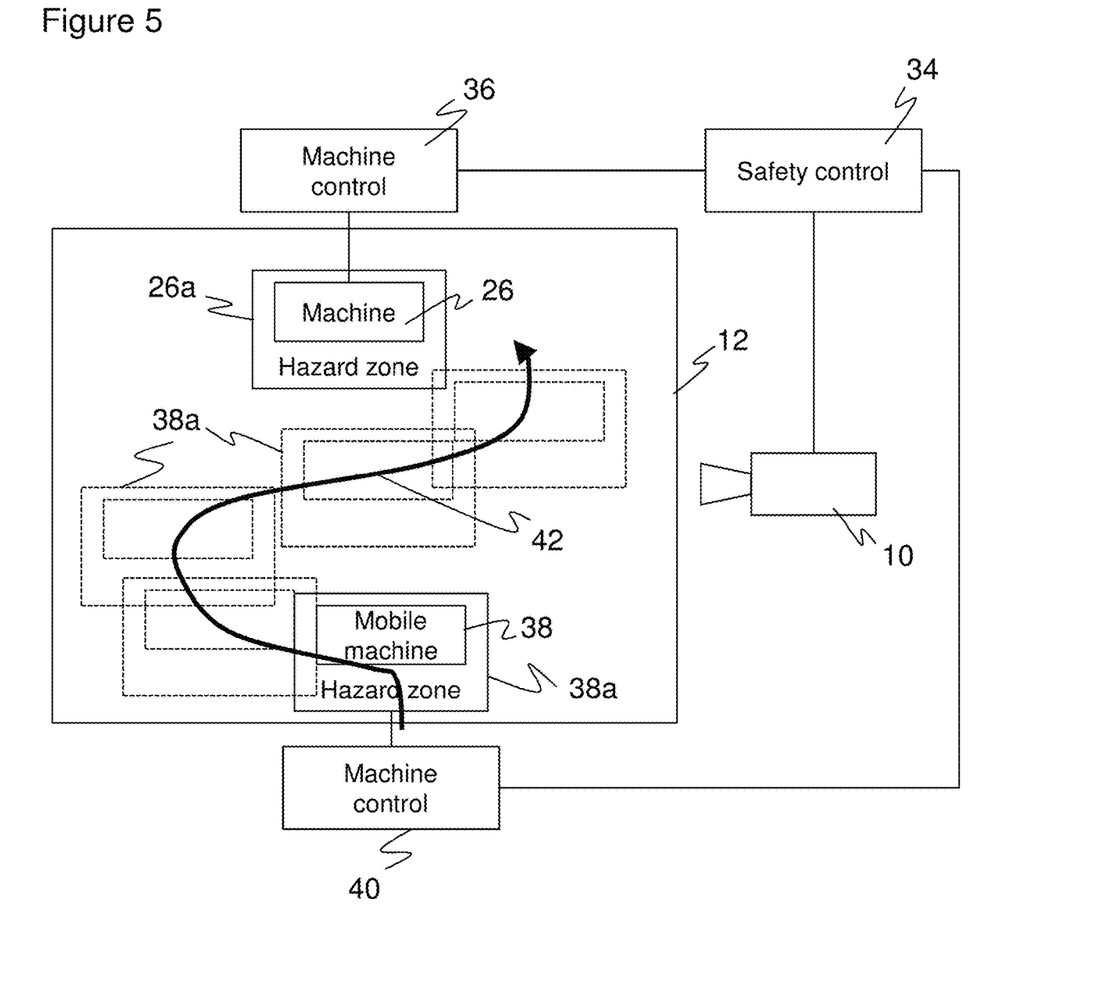
FIG. 5 a schematic representation similar to FIG. 5 with a sketched movement of the machine and of the mobile hazard zone through the monitored zone.

The further hazard zone 38*a* is preferably moved along with the mobile machine 38. This is illustrated in FIG. 5. The mobile machine 38 moves on the movement path 42 drawn by way of example. The further hazard zone 38*a* follows the movement path with the mobile machine 38, as drawn by dashed lines for some positions of the mobile machine 38. The co-movement of the further hazard zone 38*a* can in particular be achieved in that a respective additional hazard zone 38*a* is activated at a new position of the mobile machine 38, with then the previous hazard zone 38*a* being dissolved or deactivated after the handover to the additional hazard zone 38*a*. Care must be taken with such a chain of consecutive hazard zones 38a that the spatial zone taken up by an additional hazard zone 38a is free of objects 28. Otherwise, the mobile machine 38 should not move there, on the one hand. In addition, no objects 28 are preferably detected within a hazard zone 38a, which is only permitted if the freedom from objects has been ensured beforehand.

Referring back to FIG. 4, it should now be explained how a decision is made whether a penetrating objects is a potential person 28 or a mobile machine 38 and whether accordingly a further hazard zone 38a should be set up. A detected object is recognized for this purpose. It can be an individual identification, a classification of an object type that is, for example, recognized as a robot or AGV, or a recognition on the basis of general properties such as the size and the speed under heuristic assumptions of the kind that a large, fast object represents a hazard. However, as long as the object is not identified, the possible safety-relevant responses are extremely limited, for example to a warning, because there are otherwise no possibilities of influencing the behavior of the object.

The identification can be based on optical features. An example for this is a contour detection, wherein a measured contour of an object is compared with a known contour or with known contour properties. On the other hand, a mobile machine 38 can also be separately provided with optical features. Color features, easily detectable and distinguishable 3D structures, or optical codes are inter alia conceivable for this purpose.

The monitoring sensor 10 itself is a possibility of detecting optical features. Due to the often relatively large working distance of a plurality of meters, in a preferred embodiment at least one additional sensor 44 is attached that is likewise connected to the safety control 34 and that detects optical features from a more suitable or at least additional perspective. It is particularly preferably a barcode scanner or a camera-based code reader. An additional sensor 44 can, however, also evaluate very different features than optical features, for example it can be configured as an RFID reader and can communicate with an RFID tag of the mobile machine. The identification can also take place or be supported by an exchange of information, in particular wirelessly, between the machine control 40 and the safety control 34. Like all safety-relevant communication, this is preferably done via safe protocols.

The identification is considerably simplified when at least one fixed entry zone 46 is agreed via which mobile machines 38 penetrate into the spatial zone 12. It is sufficient to carry out the identification once and then to maintain it during the presence of the mobile machine 38 in the spatial zone 12. This is optionally cyclically rechecked at specific positions or in specific situations, for instance when the object separation is no longer unambiguously possible. The entry zone 46 also enables a particularly suitable assembly position for an additional sensor 44.

On the first detection of a mobile machine 38, it is first a question of recognizing at all that a further hazard zone 38a should be generated. Helpful hazard zone information can, however, be simultaneously acquired. Some of the hazard zone information can selectively be measured or communicated by means of the monitoring sensor 10, with the communication taking place, for example, by reading optical codes or RFID tags or by communication with the machine control 40. This is optically detectable hazard zone information such as the position, direction of movement, speed, previous movement path, or object geometry. It is sensible for higher safety demands both to detect such hazard zone information redundantly itself and to communicate it and then to compare the self-monitoring and the communicated expectation with one another.

Further conceivable hazard zone information can be acquired by linking with prior knowledge, for example, from a data base from an identification of the mobile machine 38, for instance its exact dimensions and geometry, maximum ranges, and speeds, and possibly also the planned process. Dynamic hazard zone information how the currently planned movement, the planned worksteps, and special working modes change the specified movement parameters and the maximum speed can also be communicated by the machine control 40. The mobile machine 40 possibly also comprises its own sensor system whose data are evaluated or communicated by the machine control 40.

The further hazard zone 38a is then designed on the basis of the hazard zone information, to the extent it has been determined or detected. Typical influencing parameters for the design of the further hazard zone 38a and the safety distances are the movement vectors of the object 28 and of the mobile machine 38. The fixing of a further hazard zone 38a is particularly simple when the hazard zone information already includes the required hazard zone configuration as such. The behavior of the mobile machine 38 is known in principle so that how it can best be represented by a hazard zone 38a can also be fixed in advance or by the machine control 40. As already explained for the co-movement of the further hazard zone 38a with respect to FIG. 5, a further hazard zone 38a is preferably only set up in a zone in which there is no object except for the mobile machine 38.

The protection of the worker is thus also made possible overall in accordance with the invention in fenceless production with mobile machines 38. The mobile machines 38 represent new hazards that are, however, appropriately secured by the respective further hazard zone 38a. It is conceivable in another respect, contrary to FIG. 4, not to provide a stationary machine 26. The sensor arrangement then monitors the spatial zone 12 and always only carries out a distance evaluation and a securing when at least one mobile machine 38 is in the spatial zone 12. A particular form of mobile machine 38 is a mobile robot that does not move itself, but is mounted on a movable platform. Its movement can then be divided into a basic movement of the platform and the movement of the robot with respect to the platform. This does not change anything with respect to the principles of securing by means of a further hazard zone 38a, except that the further hazard zone 38a is dimensioned a little more generously and greater distances are possibly required between the object 28 and the further hazard zone 38a.

Independently of the specific configuration of stationary machines 26 and mobile machines 38, every machine participating in the process is controlled and monitored in a safety-relevant manner while taking account of and processing the provided data. The worker is also safety identified by personal recognition in a conceivable additional step. Incorrect responses to objects that are not a person at all are thus suppressed and the risk evaluation becomes even more targeted and accurate.

The invention claimed is:

1. A sensor arrangement for securing a monitored zone having at least one hazard zone with respect to a machine, wherein the sensor arrangement comprises:
   at least one optoelectronic monitoring sensor for detecting objects in the monitored zone; and
   a control and evaluation unit that compares the positions of detected objects relative to the hazard zone, initiates a safety-relevant response of the machine in the case of a dangerous position, and generates and monitors a further hazard zone with respect to an additional detected object.

2. The sensor arrangement in accordance with claim 1, wherein the comparison of the positions of detected objects with the hazard zone comprises the determination of a shortest distance of the object from the hazard zone.

3. The sensor arrangement in accordance with claim 1, wherein the control and evaluation unit moves the further hazard zone along with the additional detected object as a dynamic hazard zone.

4. The sensor arrangement in accordance with claim 1, wherein the monitoring sensor is a camera.

5. The sensor arrangement in accordance with claim 4, wherein the monitoring sensor is a 3D camera.

6. The sensor arrangement in accordance with claim 1, further comprising a safety control in which at least a part of the control and evaluation unit is implemented.

7. The sensor arrangement in accordance with claim 1, wherein the control and evaluation unit recognizes with the aid of the detection by the monitoring sensor, whether the further hazard zone is generated with respect to the additional detected object.

8. The sensor arrangement in accordance with claim 1, wherein the control and evaluation unit identifies a contour or another optically detectable structure of the detected object.

9. The sensor arrangement in accordance with claim 1, further comprising an additional sensor and wherein the control and evaluation unit recognizes whether the further hazard zone is generated with respect to the additional detected object using data of the additional sensor.

10. The sensor arrangement in accordance with claim 9, wherein the additional sensor is one of an optical code reader and an RFID reader.

11. The sensor arrangement in accordance with claim 1, wherein the control and evaluation unit recognizes a detected object as a permitted object with the help of the detection by the monitoring sensor or using data of an additional sensor, with a permitted object not triggering any safety-relevant response independently of its position with respect to the hazard zone.

12. The sensor arrangement in accordance with claim 1, wherein the control and evaluation unit outputs feedback on the generation of a hazard zone to the detected object.

13. The sensor arrangement in accordance with claim 1, wherein the control and evaluation unit generates a hazard zone with respect to a detected object only at at least one specific position in the monitored zone.

14. The sensor arrangement in accordance with claim 1, wherein the control and evaluation unit obtains hazard zone information for the further hazard zone from the additional detected object.

15. The sensor arrangement in accordance with claim 1, wherein the control and evaluation unit determines hazard zone information on the hazard zone to be generated with the aid of the monitoring sensor.

16. The sensor arrangement in accordance with claim 14, wherein the hazard zone information comprises at least one of the following pieces of information: a binary piece of information that a hazard zone should be generated; a position; a speed; a previous or probable movement path; or a geometry of the detected object.

17. The sensor arrangement in accordance with claim 15, wherein the hazard zone information comprises at least one of the following pieces of information: a binary piece of information that a hazard zone should be generated; a position; a speed; a previous or probable movement path; or a geometry of the detected object.

18. The sensor arrangement in accordance with claim 14, wherein the hazard zone information comprises at least one of the following pieces of information: a planned movement path; a planned speed; a planned workstep; a volume adopted in the future; or a hazard zone configuration.

19. The sensor arrangement in accordance with claim 15, wherein the hazard zone information comprises at least one of the following pieces of information: a planned movement path; a planned speed; a planned workstep; a volume adopted in the future; or a hazard zone configuration.

20. A method of securing a monitored zone having at least one hazard zone with respect to a machine, comprising the steps of:
detecting objects in the monitored zone;
comparing positions of the detected objects relative to the hazard zone to initiate a safety-relevant response of the machine in the case of a dangerous position; and
generating and monitoring wherein a further hazard zone with respect to an additional detected object.

* * * * *